(12) United States Patent
Noh et al.

(10) Patent No.: US 10,254,452 B2
(45) Date of Patent: Apr. 9, 2019

(54) REFLECTOR AND DISPLAY DEVICE HAVING THE SAME

(71) Applicant: LG Display Co., Ltd., Seoul (KR)

(72) Inventors: YoungHoon Noh, Paju-si (KR); Goeun Jung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 303 days.

(21) Appl. No.: 14/747,900

(22) Filed: Jun. 23, 2015

(65) Prior Publication Data

US 2015/0293285 A1    Oct. 15, 2015

Related U.S. Application Data

(62) Division of application No. 13/421,438, filed on Mar. 15, 2012, now Pat. No. 9,081,248.

(30) Foreign Application Priority Data

Mar. 24, 2011  (KR) .................. 10-2011-0026591

(51) Int. Cl.
| | |
|---|---|
| *G02B 5/28* | (2006.01) |
| *G02F 1/167* | (2019.01) |
| *G02B 5/20* | (2006.01) |
| *G02F 1/1335* | (2006.01) |

(52) U.S. Cl.
CPC ............ *G02B 5/285* (2013.01); *G02B 5/201* (2013.01); *G02F 1/133514* (2013.01); *G02F 1/167* (2013.01); *G02F 2001/133521* (2013.01)

(58) Field of Classification Search
CPC ... G02B 5/285; G02B 5/201; G02F 1/133514; G02F 1/167; G02F 2001/133521

USPC ............................ 359/584–590; 345/87, 107
See application file for complete search history.

(56) References Cited

U.S. PATENT DOCUMENTS

| | | | |
|---|---|---|---|
| 6,172,726 B1 | 1/2001 | Matsute et al. | |
| 6,565,982 B1 * | 5/2003 | Ouderkirk | ......... B32B 17/10018 |
| | | | 359/584 |
| 6,744,559 B2 * | 6/2004 | Phillips | ................ C09C 1/0015 |
| | | | 359/577 |
| 6,791,261 B1 * | 9/2004 | Shimoda | ............ H01L 27/3211 |
| | | | 313/112 |
| 2004/0233524 A1 | 11/2004 | Lippey et al. | |
| 2007/0024954 A1 | 2/2007 | Sakamoto | |

(Continued)

FOREIGN PATENT DOCUMENTS

| | | |
|---|---|---|
| CN | 1664695 A | 9/2005 |
| CN | 1705907 A | 12/2005 |

(Continued)

*Primary Examiner* — Kristina M Deherrera
(74) *Attorney, Agent, or Firm* — Birch, Stewart, Kolasch & Birch, LLP

(57) ABSTRACT

A reflector is discussed. A reflector can include a first reflective layer pair reflecting red light, a second reflective layer pair reflecting green light and a third reflective layer pair reflecting blue light, wherein the first to third reflective layer pairs are formed as a plurality of inorganic layers, the first, second and third reflective layer pair are sequentially stacked iteratively, the first reflective layer pair includes a stop band corresponds to red color wavelength, the second reflective layer pair includes a stop band corresponds to green color wavelength, and the third reflective layer pair includes a stop band corresponds to blue color wavelength.

10 Claims, 9 Drawing Sheets

(56) References Cited

U.S. PATENT DOCUMENTS

| | | |
|---|---|---|
| 2007/0273956 A1 | 11/2007 | Kim et al. |
| 2008/0094528 A1* | 4/2008 | Robinson ............... G02B 5/285 |
| | | 349/1 |
| 2010/0003883 A1 | 1/2010 | Lee et al. |
| 2010/0053387 A1 | 3/2010 | Kim et al. |
| 2011/0026099 A1 | 2/2011 | Kwon et al. |
| 2012/0032992 A1 | 2/2012 | Lim et al. |
| 2012/0236385 A1* | 9/2012 | Yun ....................... G02B 5/085 |
| | | 359/230 |

FOREIGN PATENT DOCUMENTS

| | | |
|---|---|---|
| CN | 101989023 A | 3/2011 |
| JP | 11-326953 A | 11/1999 |
| JP | 2009-283246 A | 12/2009 |
| KR | 10-2007-0112943 A | 11/2007 |
| KR | 10-2010-0046876 A | 5/2010 |

* cited by examiner

FIG.4

| LOW REFRACTIVE INDEX REFLECTIVE LAYER (SiO$_2$) | | | |
|---|---|---|---|
| REFLECTED WAVELENGTHS (nm) | THICKNESSES (nm) | REFLECTED WAVELENGTHS (nm) | THICKNESSES (nm) |
| 450 | 77.586 | 580 | 58.000 |
| 460 | 79.310 | 590 | 59.000 |
| 470 | 81.034 | 600 | 60.000 |
| 480 | 82.759 | 610 | 61.000 |
| 490 | 84.483 | 620 | 62.000 |
| 500 | 86.207 | 630 | 63.000 |
| 510 | 87.931 | 640 | 64.000 |
| 520 | 89.655 | 650 | 65.000 |
| 530 | 91.379 | 660 | 66.000 |
| 540 | 93.103 | 670 | 67.000 |
| 550 | 94.828 | 680 | 68.000 |
| 560 | 96.552 | 690 | 69.000 |
| 570 | 98.276 | 700 | 70.000 |

FIG.5

| HIGH REFRACTIVE INDEX REFLECTIVE LAYER ($TiO_2$) | | | |
|---|---|---|---|
| REFLECTED WAVELENGTHS (nm) | THICKNESSES (nm) | REFLECTED WAVELENGTHS (nm) | THICKNESSES (nm) |
| 450 | 45.000 | 580 | 58.000 |
| 460 | 46.000 | 590 | 59.000 |
| 470 | 47.000 | 600 | 60.000 |
| 480 | 48.000 | 610 | 61.000 |
| 490 | 49.000 | 620 | 62.000 |
| 500 | 50.000 | 630 | 63.000 |
| 510 | 51.000 | 640 | 64.000 |
| 520 | 52.000 | 650 | 65.000 |
| 530 | 53.000 | 660 | 66.000 |
| 540 | 54.000 | 670 | 67.000 |
| 550 | 55.000 | 680 | 68.000 |
| 560 | 56.000 | 690 | 69.000 |
| 570 | 57.000 | 700 | 70.000 |

REFLECTOR AND DISPLAY DEVICE HAVING THE SAME

CROSS-REFERENCE TO RELATED APPLICATIONS

This application is a Divisional of co-pending U.S. application Ser. No. 13/421,438 filed on Mar. 15, 2012, which claims the priority benefit of the Korean Patent Application No. 10-2011-0026591 filed on Mar. 24, 2011. The contents of all of these applications are hereby incorporated by reference as fully set forth herein in their entirety.

BACKGROUND OF THE INVENTION

Field of the Invention

The present invention relates to a display device, and more particularly, to a high efficiency reflector which reflects multiple color light, and to a display device which can increase display quality by applying the high efficiency reflector thereto.

Description of the Related Art

Electrophoretic display devices denote devices that display an image with electrophoresis in which colored charged particles move by an electric field given from the outside. Herein, electrophoresis denotes an electrophoretic motion where with charged particles being dispersed into a solvent, the charged particles moves inside the solvent by Coulomb force when applying an electric field.

Electrophoretic display devices using electrophoresis have bistability, and thus can maintain a displayed image for a long time even when an applied voltage is removed. That is, since electrophoretic display devices maintain a constant screen for a long time even when a voltage is not continuously applied thereto, the electrophoretic display devices are display devices suitable for an e-book field that does not require the quick change of a screen.

Also, electrophoretic display devices are not dependent on a viewing angle unlike Liquid Crystal Display (LCD) devices, and moreover, provide an image comfortable for eyes by the degree similar to papers because reflecting external light to display an image. Furthermore, electrophoretic display devices have flexibility, low power consumption, and eco like. Accordingly, the demand of electrophoretic display devices is increasing.

FIG. 1 is a sectional view illustrating a related art electrophoretic display device.

Referring to FIG. 1, the related art electrophoretic display device includes a lower substrate 10 and an upper substrate 20 that are facing-coupled to each other, and an electrophoretic film 30 disposed between the lower substrate 10 and the upper substrate 20.

The lower substrate 10 includes a plurality of pixel electrodes (not shown), and a plurality of thin film transistors (TFT, not shown) for respectively applying a voltage to the pixel electrodes.

A common electrode 22 is formed at the upper substrate 20.

The electrophoretic film 30 includes a plurality of microcapsules 32 that are formed of charged particles and a solvent, and an adhesive layer 34 that protects the microcapsules 32 and is adhesive to the lower substrate 10.

Herein, each of the microcapsules 32 includes positive charged particles, negative charged particles, and a solvent that surrounds each of the positive and negative charged particles.

When an electric field is generated between the pixel electrode of the lower substrate 10 and the common electrode 22 of the upper substrate 20, the charged particles included in the microcapsules 32 move toward the upper substrate 20 or the lower substrate 10 by electrophoresis, thereby realizing an image.

The lower substrate 10 that is formed through a separate process, the upper substrate 20 that is formed by a separate process different from the formation process of the lower substrate 10, and the electrophoretic film 30 that is adhered to the upper substrate 20 by a lamination process are manufactured separately, and then by coupling the two substrates 10 and 20, the related art electrophoretic display device is completed.

Herein, the electrophoretic film 30 is managed and conveyed, with the electrophoretic film 30 being adhered to the upper substrate 20. Afterward, the passivation layer adhered to the adhesive layer 34 is removed from the upper substrate 20 with the electrophoretic film 30 adhered thereto so as to expose the adhesive layer 34. By coupling the upper substrate 20 and the lower substrate 10 through the adhesive layer 34, the electrophoretic display device is completed.

In the related art electrophoretic display device, since the lower substrate 10, upper substrate 20, and electrophorectic film 30 are manufactured separately, a manufacturing process is complicated, and much time is taken in manufacturing, causing the decrease in manufacturing efficiency. Also, it is difficult to accurately arrange the upper substrate 20 and the lower substrate 10, and a failure occurs.

Moreover, the related art electrophoretic display device displays an image by using the reflection of external light, but has a low contrast ratio and a low color reproduction ratio because the light reflection efficiencies of the microcapsules 32 are low.

To solve such limitations, a structure was proposed where a metal reflector is formed on a lower substrate and thus increases a light reflection rate, but in the structure, since a plurality of parasitic capacitors are formed between the reflector and the pixels of the lower substrate, the parasitic capacitors exert a bad influence on the driving of the pixels.

In applying the metal reflector of the related art, in order not to affect the driving of an active matrix of pixels, the related art requires a patterning process and a process that deposits a metal material over the metal reflector.

The metal reflector of the related art reflects only 40% of incident light, and thus has limitations in increasing luminance, a contrast ratio, and a color reproduction ratio.

SUMMARY OF THE INVENTION

Accordingly, the present invention is directed to provide a reflector and a display device having the same that substantially obviate one or more problems due to limitations and disadvantages of the related art.

An aspect of the present invention is directed to provide a display device which has high luminance, a high contrast ratio, and a high color reproduction ratio.

Another aspect of the present invention is directed to provide a high efficiency reflector which can increase the light efficiency of reflective display devices and self-emitting display devices.

Another aspect of the present invention is directed to provide an electrophoretic display device which can realize a high-quality image in various colors.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a reflector including: a first reflective layer pair reflecting red light; a second reflective layer pair reflecting green light; and a third reflective layer pair reflecting blue light, wherein the first to third reflective layer pairs are formed as a plurality of inorganic layers.

In another aspect of the present invention, there is provided a reflector including: a plurality of reflective layer pairs including a first reflective layer having a first refractive index, and a second reflective layer having a refractive index lower than the first refractive index, wherein the reflective layer pairs are formed to have different thicknesses, and selectively reflect incident light according to wavelengths.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 is a view showing the thicknesses of a low refractive index reflection layer by reflection wavelength;

FIG. 5 is a view showing the thicknesses of a high refractive index reflection layer by reflection wavelength;

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

In description of embodiments of the present invention, when a structure is described as being formed at an upper portion/lower portion of another structure or on/under the other structure, this description should be construed as including a case where the structures contact each other and moreover a case where a third structure is disposed therebetween.

Before a description that is made with reference to the drawings, a display device according to an embodiment of the present invention may include a reflective display device, a self-emitting display device, and a semi-transmissive display device. In the following description that is made with reference to the drawings, a reflective display device, specifically, an electrophoretic display device will be described as an example of the present invention.

The technical spirit and scope of the below-described present invention may be identically applied to an electrophoretic display device including a mono type and a color filter, and an electrophoretic display device where charged particles in a display solvent (e-ink) are colored in at least one of black, white, red, blue, green, yellow, cyan, and magenta.

Hereinafter, a display device according to embodiments of the present invention will be described in detail with reference to the accompanying drawings.

Figure 1:
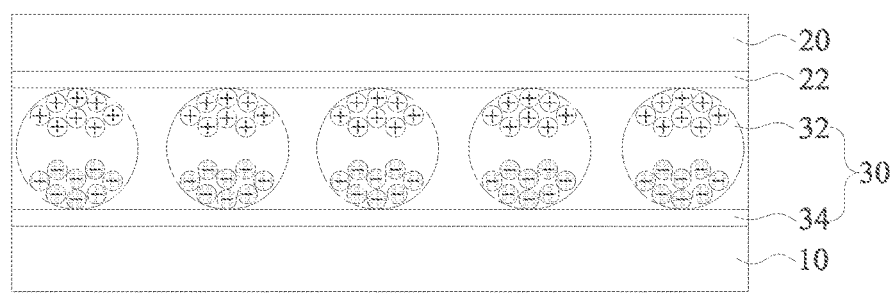
FIG. 1 is a view illustrating a structure of a related art electrophorectic display device.
Figure 2:
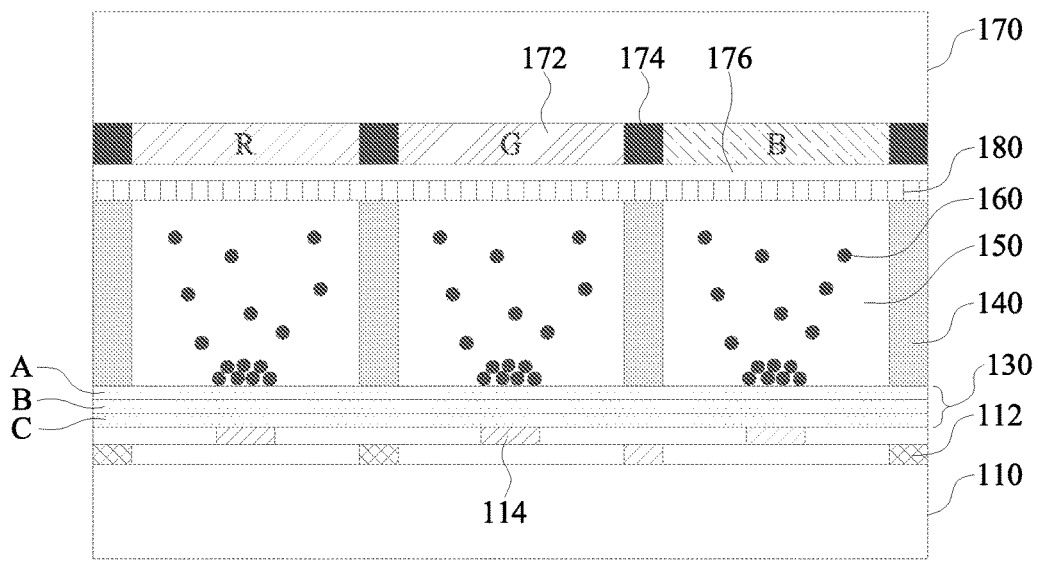
FIG. 2 is a view illustrating a display device according to an embodiment of the present invention.

FIG. 2 is a view illustrating a display device according to an embodiment of the present invention.

Referring to FIG. 2, the display device according to an embodiment of the present invention includes an upper substrate 170, a lower substrate 110, and an electrophoretic layer with a display solvent internalized therein.

The upper substrate 170 includes: a plurality of color filters 172 that respectively convert the input light and output light of a plurality of pixels into multiple color light; a light blocking layer 174 (for example, a black matrix) that defines the pixels and prevents color mixture between the pixels; an overcoat layer 176 that planarizes the upper substrate 170; and a common electrode 180.

The color filters 172, for example, may be configured with a plurality of red color filters, green color filters, and blue color filters.

The upper substrate 170 is required to be transparent for displaying an image, and thus uses a transparent glass substrate or a flexible and transparent plastic substrate as a base substrate.

The common electrode 180 of the upper substrate 170 is formed in correspondence with a plurality of pixel electrodes 114 formed at the lower substrate 110, and supplies a common voltage Vcom to the pixels.

The common electrode 180 transmits light incident from the outside and light that is reflected by the below-described reflector 130. For this end, the common electrode 180 is formed of a conductive transparent material such as indium tin oxide (ITO) or indium zinc oxide (IZO).

In FIG. 2, the common electrode 180 is illustrated as being formed in a plate shape to correspond to all the pixels, but this is to illustrate one embodiment of the present invention. As another embodiment of the present invention, the common electrode 180 may be patterned and formed to correspond to all or some of the pixels.

The lower substrate 110 includes a plurality of thin film transistors (TFTs) 112 that respectively drive the pixels; a plurality of pixel electrodes 114 that receive a plurality of pixel voltages which correspond to input image data and are supplied to the pixels, respectively; and a reflector 130 that reflects light incident on the pixels. Herein, the electrophoretic layer is formed on the reflector 130.

The lower substrate 110 may apply a transparent glass substrate, a plastic substrate having flexibility, or a metal substrate having flexibility thereto as the base substrate. However, the lower substrate 110 is disposed on the reverse of a screen displaying an image, thus requiring no transparency.

Although not shown, a plurality of intersected gate lines and data lines are formed at the lower substrate 110, and the TFT 112 is formed in each of a plurality of regions where the gate lines and the data lines are intersected perpendicularly.

Herein, the gate lines and the data lines may be formed in a single layer that is formed of silver (Ag), aluminum (Al), or an alloy thereof, which has low resistivity.

As another example, the gate lines and the data lines may be formed in a multilayer that includes the single layer and a layer which is formed of chromium (Cr), titanium (Ti), or tantalum (Ta), which has excellent electric characteristic.

A gate electrode of each of the TFTs 112 is connected to a corresponding gate line, a source electrode of the TFT 112 is connected to a corresponding data line, and a drain electrode of the TFT 112 is connected to a corresponding pixel electrode 114. A data voltage applied to the data line is supplied to the pixel electrode 114 through switching in the TFT 112.

The pixel electrodes 114 are formed in respective correspondence with a plurality of pixel regions that are defined by a plurality of partition walls 140. Each of the pixel electrodes 114 receives a data voltage which is inputted to a corresponding pixel by switching of a corresponding TFT 112. In this case, each pixel electrode 114 may be formed in a central portion of a corresponding pixel region so as to smoothly realize an image by the electrophoretic driving of charged particles 160.

The pixel electrode 114 is a conductive metal layer, electrically connected to the drain electrode of the TFT 112 through a contact hole, and formed of copper (Cu), Al, or ITO. Also, the pixel electrode 114 may be formed by depositing nickel (Ni) and/or gold (Au) on Cu, Al, or ITO.

An electric field is generated in each pixel by the common voltage Vcom applied to a pixel through the common electrode 180 and a data voltage applied to the pixel through a corresponding pixel electrode 114, and the charged particles 160 move upward and downward in a solvent 150 by the electric field generated in each pixel, thereby realizing an image.

The electrophoretic layer includes a display solvent that is filled into each pixel region (filling cell) that is defined by corresponding partition walls 140. In this case, each of the partition walls 140 is formed to surround a corresponding pixel, and the display solvent is filled and internalized into each pixel region that is defined by corresponding partition walls 140.

The display solvent includes the charged particles 160 that are colored in a certain color (for example, black), and the solvent 150 that acts as a medium enabling the moving of the charged particles 160. Herein, the solvent 150 may include a binder for increasing the bistability of the charged particles 160.

The partition walls 140 are formed on the lower substrate 110 where the below-described reflector 130 is formed, and define a plurality of regions (filling cells) into which the display solvent is filled. In this case, the partition walls 140 are formed to have a certain height and a certain width. As an example, the partition walls 140 may be formed to have a height of 10 µm to 100 µm and a width of 5 µm to 30 µm.

The partition walls 140 may be formed by a photolithography process, a mold printing process, an imprinting process, or an embossing process.

Moreover, in order to match with the display solvent in physical properties, the partition walls 140 may be formed of a polymer, an organic material such as an epoxy acrylic-based resin, or an organic material that is capable of being coated in the shape of an organic Self-Assembled Monolayer (SAM) layer.

The charged particles 160 may be electrically charged to a positive (+) polarity or a negative (−) polarity, and colored in at least one of black, white, red, blue, green, yellow, cyan, and magenta. In FIG. 2, the charged particles 160 are exemplarily illustrated as being colored in black.

The solvent 155 may use one of halogenated solvents, saturated hydrocarbons, silicone oils, low molecular weight halogen-containing polymers, epoxides, vinyl ethers, vinyl ester, aromatic hydrocarbon, toluene, naphthalene, paraffinic liquids, and poly chlorotrifluoroethylene polymers, or use materials, which are selected from among the materials, in combination.

The display solvent may be filled into a corresponding pixel region by a die coating process, a casting process, a bar coating process, a slit coating process, a dispense process, a squeezing process, a screen printing process, an inkjet printing process, or a photolithography process.

Figure 3:
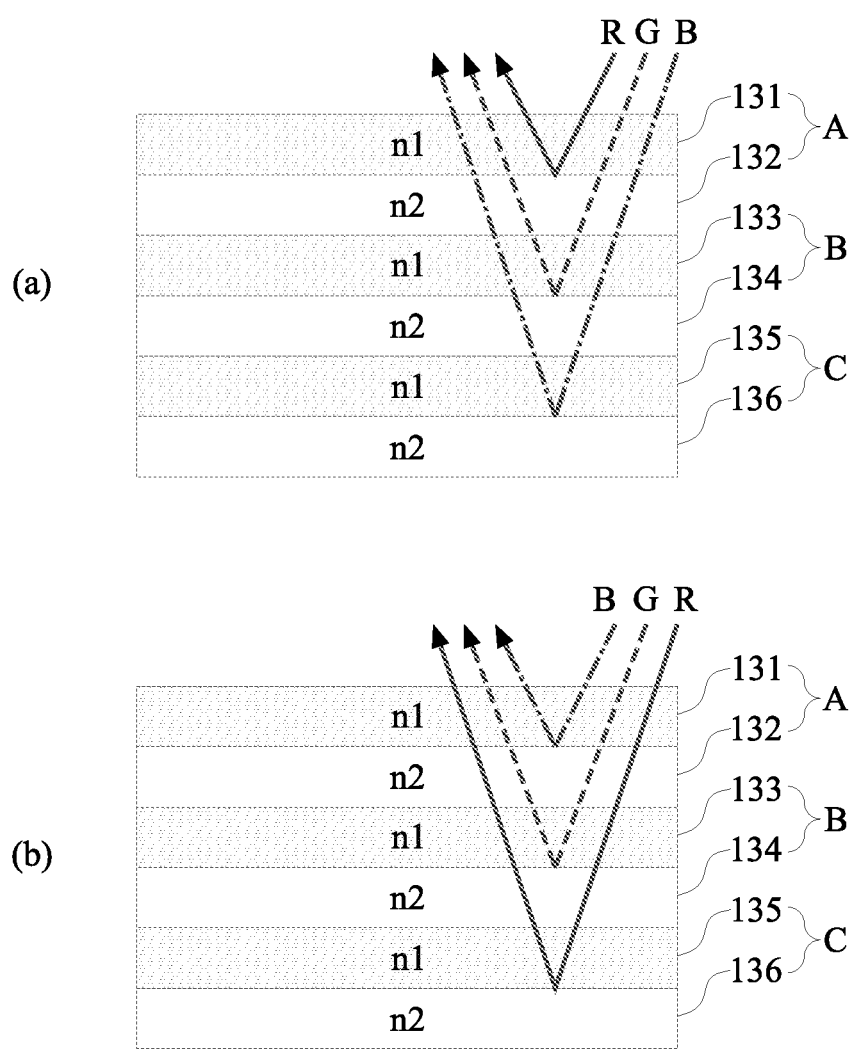
FIG. 3 is a view illustrating a reflector of the display device according to an embodiment of the present invention.

FIG. 3 is a view illustrating a reflector of the display device according to an embodiment of the present invention.

Referring to FIG. 3, the reflector 130 includes a plurality of reflective layers 131 to 136. The reflective layer 131 of a high refractive index (n1) and the reflective layer 132 of a low refractive index (n2) form one pair A, the reflective layer 133 of a high refractive index (n1) and the reflective layer 134 of a low refractive index (n2) form one pair B, and the reflective layer 135 of a high refractive index (n1) and the reflective layer 136 of a low refractive index (n2) form one pair C. The reflector 130 has a structure where the reflective layer pairs A to C are sequentially stacked iteratively. Herein, the high refractive index reflective layers 131, 133 and 135 (high refractive index inorganic layer) and the low refractive index reflective layers 132, 134 and 135 (low refractive index inorganic layer) are formed as insulation layers of nonconductive materials.

The high refractive index reflective layers 131, 133 and 135 may have a refractive index of 1.9 to 2.8, and may be formed of any one inorganic material of $TiO_2$, SiNx, ZnO, and $Al_2O_3$. Alternatively, the high refractive index reflective layers 131, 133 and 135 may also be formed by selectively combining at least two materials of $TiO_2$, SiNx, ZnO, and $Al_2O_3$.

The low refractive index reflective layers 132, 134 and 136 may have a refractive index of 1.3 to 1.7, and may be formed by using $SiO_2$ as an inorganic material. Alternatively, the low refractive index reflective layers 132, 134 and 136 may also be formed of an inorganic material including $SiO_2$.

The reflective layers 131 to 136 may be formed by a sputtering process or a Chemical Vapor Deposition (CVD) process. When the reflective layers 131 to 136 are formed of a dissolvable material, the reflective layers 131 to 136 may be formed by a spin coating process or a spray process.

The reflector 130 according to an embodiment of the present invention is formed of a plurality of inorganic insulators, and thus does not affect the driving of the pixel electrode 114 and common electrode 180.

In FIG. 3 and the above description, the reflective layers are stacked in order from the high refractive index (n1)

reflective layers 131, 133 and 135 to the low refractive index (n2) reflective layers 132, 134 and 136, but the order in which the high refractive index (n1) reflective layers and the low refractive index (n2) reflective layers are stacked is not limited thereto. Also, the reflector 130 may be formed such that the number of high refractive index reflective layer-low refractive index reflective layer pairs (the number of reflective layer pairs) is a minimum of two to a maximum of ten.

A reflection rate ($R_{DBR}$) of light incident on a reflector, as expressed in Equation (1), is determined with a refractive index ($\bar{n}_h$) of the high refractive index reflective layer, a refractive index ($\bar{n}_l$) of the low refractive index reflective layer, and the number (m) of high refractive index reflective layer-low refractive index reflective layer pairs.

$$R_{DBR} = \left[ \frac{1 - (\bar{n}_l/\bar{n}_h)^{2m}}{1 + (\bar{n}_l/\bar{n}_h)^{2m}} \right]^2 \quad (1)$$

where $n_l$ denotes the refractive index of the low refractive index reflective layer, $n_h$ denotes the refractive index of the high refractive index reflective layer, and m denotes the number of high refractive index reflective layer-low refractive index reflective layer pairs. As expressed in Equation (1), as the number of high refractive index reflective layer-low refractive index reflective layer pairs increases, the reflection rate of light incident on the reflector increases.

Light incident on the pixels transmits red, green, and blue color filters 172, and thus has a specific wavelength according to colors. Herein, red light has a wavelength of 630 nm to 780 nm, green light has a wavelength of 450 nm to 560 nm, and blue light has a wavelength of 450 nm to 490 nm.

Accordingly, the reflector 130 needs to reflect light of 450 nm to 780 nm for reflecting all color light that transmits the red, green, and blue color filters 172.

The wavelength of light, reflected by the reflector 130, may vary according to a stop band based on Bragg reflection law.

As an example, the stop band of the reflector 130 is required to be sufficiently broad to include a red wavelength, a green wavelength and a blue wavelength, namely, a wavelength band of 450 nm to 780 nm, in order for the reflector 130 to reflect color light having the red wavelength, green wavelength and blue wavelength.

As another example, the reflector 130 needs to have a certain bandwidth based on multiple color light, namely, a plurality of stop bands respectively corresponding to the red wavelength, green wavelength, and blue wavelength, in order for the reflector 130 to reflect color light having the red wavelength, green wavelength, or blue wavelength.

Herein, it is theoretically possible to form a reflector having a stop band that includes a wavelength band of 450 nm to 780 nm, but it is very difficult to actually implement the reflector. Also, when the stop band of a reflector includes a wavelength band of 450 nm to 780 nm, it is unable to secure a reflection rate optimal for each of red, green, and blue.

In an embodiment of the present invention, in consideration of the above-described characteristics of the stop band, the reflector 130 is formed to have the structure where the high refractive index reflective layer-low refractive index layer pairs A to C are sequentially stacked iteratively.

In this way, the reflector 130 includes the reflective layer pairs A to C having a stop band that corresponds to the red wavelength, green wavelength and blue wavelength, and thus can efficiently reflect red, green, and blue light.

Herein, the wavelength of light reflected by the reflector 130 is determined according to the refractive indexes of the high refractive index reflective layers 131, 133 and 135, the refractive indexes of the low refractive index reflective layers 132, 134 and 136, and the thicknesses of the reflective layers 131 to 136.

The thicknesses of the high refractive index reflective layers 131, 133 and 135 and the thicknesses of the low refractive index reflective layers 132, 134 and 136, based on the wavelength of light to be reflected, may be determined with Equation (2).

$$t_{l,h} = \frac{\lambda_0}{4\bar{n}_{l,h}} \quad (2)$$

where $t_{l,h}$ denotes the thickness of the high refractive index reflective layers and the thickness of the low refractive index reflective layers, and $n_{l,h}$ denotes the refractive index (n2) of the low refractive index reflective layer and the refractive index (n1) of the high refractive index reflective layer, namely, the refractive index of a low refractive index inorganic material and the refractive index of a high refractive index inorganic material. $\lambda_0$ denotes the wavelength of light to be reflected.

As described above, color light to be reflected may be specified by adjusting the refractive indexes and thickness of the reflective layers 131 to 136, but when the refractive indexes of the reflective layers 131 to 136 are fixed, the wavelength ($\lambda_0$) of color light to be reflected, namely, reflected light may be determined by adjusting the thickness of the reflective layers 131 to 136.

On the basis of Equation (2), the low refractive index reflective layer may be formed to have a thickness of 500 Å to 1,500 Å, and the high refractive index reflective layer may be formed to have a thickness of 200 Å to 1,000 Å.

FIG. 4 is a view showing the thicknesses of low refractive index reflective layers by wavelength of light to be reflected. FIG. 5 is a view showing the thicknesses of high refractive index reflective layers by wavelength of light to be reflected.

As an example, in forming a low refractive index reflective layer-high refractive index reflective layer pair (first reflective layer pair) for reflecting blue light on the basis of a wavelength of 470 nm, the low refractive index reflective layer may be formed to have a thickness of 81.034 nm, and the high refractive index reflective layer may be formed to have a thickness of 47.000 nm.

In forming a low refractive index reflective layer-high refractive index reflective layer pair (second reflective layer pair) for reflecting green light on the basis of a wavelength of 510 nm, the low refractive index reflective layer may be formed to have a thickness of 87.931 nm, and the high refractive index reflective layer may be formed to have a thickness of 51.000 nm.

In forming a low refractive index reflective layer-high refractive index reflective layer pair (third reflective layer pair) for reflecting red light on the basis of a wavelength of 700 nm, the low refractive index reflective layer may be formed to have a thickness of 120.690 nm, and the high refractive index reflective layer may be formed to have a thickness of 70.000 nm.

As described above, the reflector 130 is formed to have a plurality of reflective layer pairs (which are formed in a structure where one low refractive index reflective layer and one high refractive index reflective layer are stacked) optimal for the reflection of red light, green light, and blue light, and thus reflects all incident red light, green light, and blue light.

That is, the first reflective layer pair may reflect first color light having a wavelength of 470 nm among wavelengths of 450 nm to 780 nm, the second reflective layer pair may reflect second color light having a wavelength of 510 nm, and the third reflective layer pair may reflect third color light having a wavelength of 700 nm.

Herein, by increasing the number of reflective layer pairs within ten and adjusting the thickness of the low refractive index reflective layer and high refractive index reflective layer that form each reflective layer pair, the reflector 130 can selectively reflect other color light corresponding to a wavelength band of 450 nm to 780 nm, in addition to the red light, green light and blue light.

Moreover, by adjusting the refractive indexes and thickness of the low refractive index reflective layer and high refractive index reflective layer that form each reflective layer pair, the reflector 130 can selectively reflect color light having a wavelength less than or equal to 450 nm and color light having a wavelength greater than or equal to 780 nm.

The reflective layer pairs A to C formed in the reflector 130 may be formed independent from the order in which red light, green light, and blue light are reflected.

As an example, as illustrated in FIG. 3A, the reflective layer pairs may be formed such that reflection is performed in the order of red light, green light, and blue light with respect to a top of the reflector 130. As another example, as illustrated in FIG. 3B, the reflective layer pairs may be formed such that reflection is performed in the order of blue light, green light, and red light with respect to a top of the reflector 130.

Herein, the reflective layer pairs may be formed of the same material, and have different thicknesses according to the wavelength of color light to be reflected. However, the present invention is not limited thereto. The low refractive index reflective layers 132, 134 and 136 of the reflective layer pairs may be formed of the same material, and the high refractive index reflective layers 131, 133 and 135 of the reflective layer pairs may be respectively formed of different materials.

Figure 6:
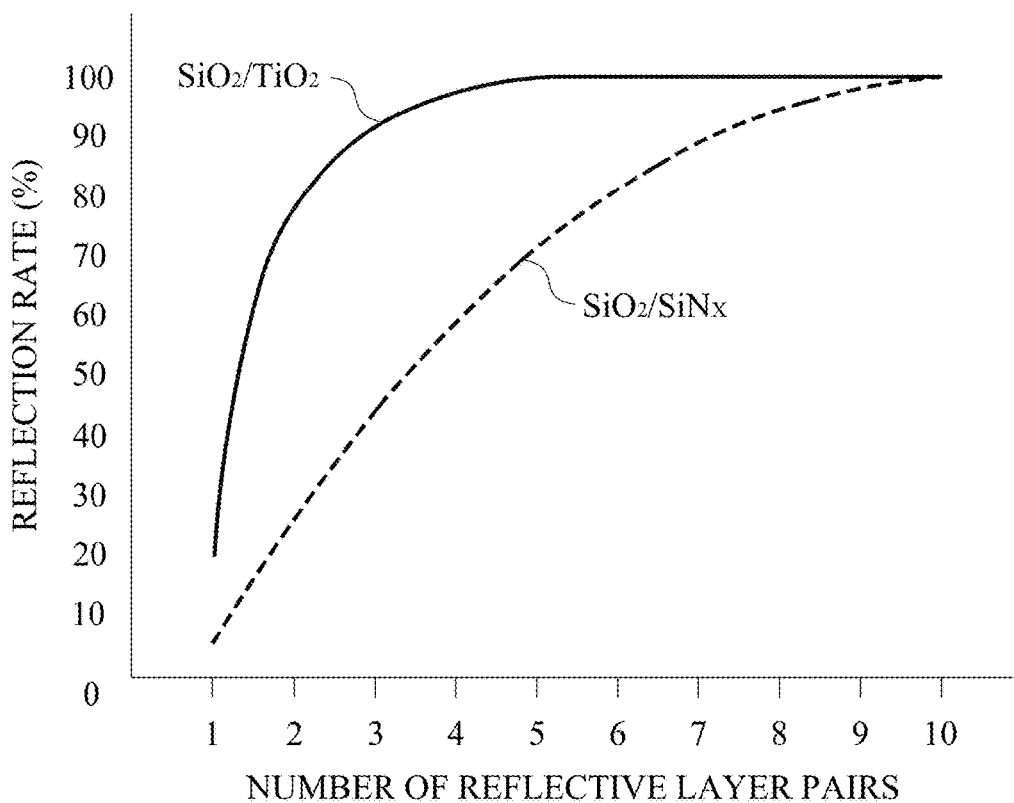
FIG. 6 is a view showing light reflection rates with respect to the number of low refractive index reflection layer-high refractive index reflection layer pairs.

FIG. 6 is a view showing light reflection rates with respect to the number of low refractive index reflective layer-high refractive index reflective layer pairs.

Referring to FIG. 6, when the reflector 130 is formed to have three reflective layer pairs for reflecting red light, green light, and blue light, it can be seen that the display device according to an embodiment of the present invention reflects 90% or more of color light incident on the reflector 130.

In the related art, when a high refractive index reflective layer is formed of SiNx, a reflector is formed to have ten reflective layer pairs, and thus reflects approximately 100% of color light incident thereon.

Unlike this, as in an embodiment of the present invention, when a high refractive index reflective layer is formed of $TiO_2$, by using only two reflective layer pairs, the reflector 130 can reflect 90% of light incident thereon, or when the reflector 130 is formed to have five or more reflective layer pairs, the reflector 130 can reflect approximately 100% of light incident thereon.

Accordingly, the present invention can enhance the luminance, contrast ratio, and color reproduction ratio of self-emitting display devices, reflective display devices, and semi-transmissive display devices such as Liquid Crystal Display (LCD) devices, Organic Light Emitting Diode (OLED) display devices, electrophoretic display devices, and electro wetting display devices.

Figure 7:
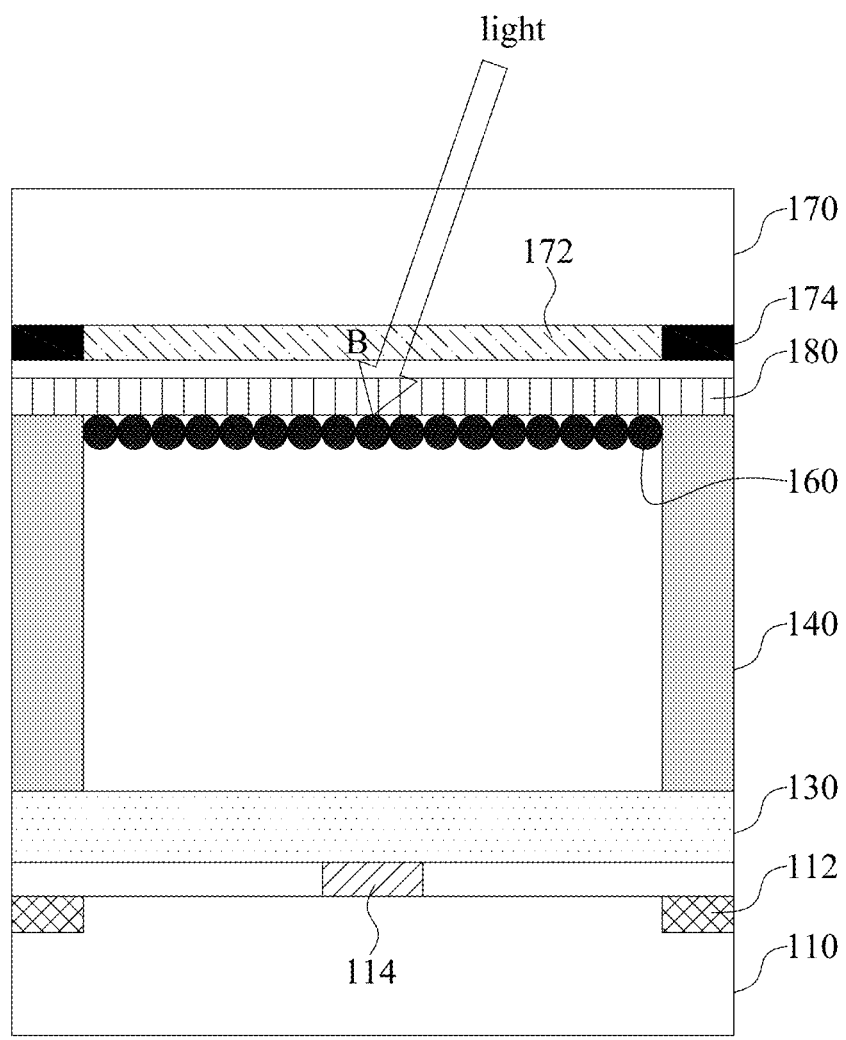
FIGS. 7 to 9 are views illustrating an image realization method of a display device according to an embodiment of the present invention.
Figure 8:
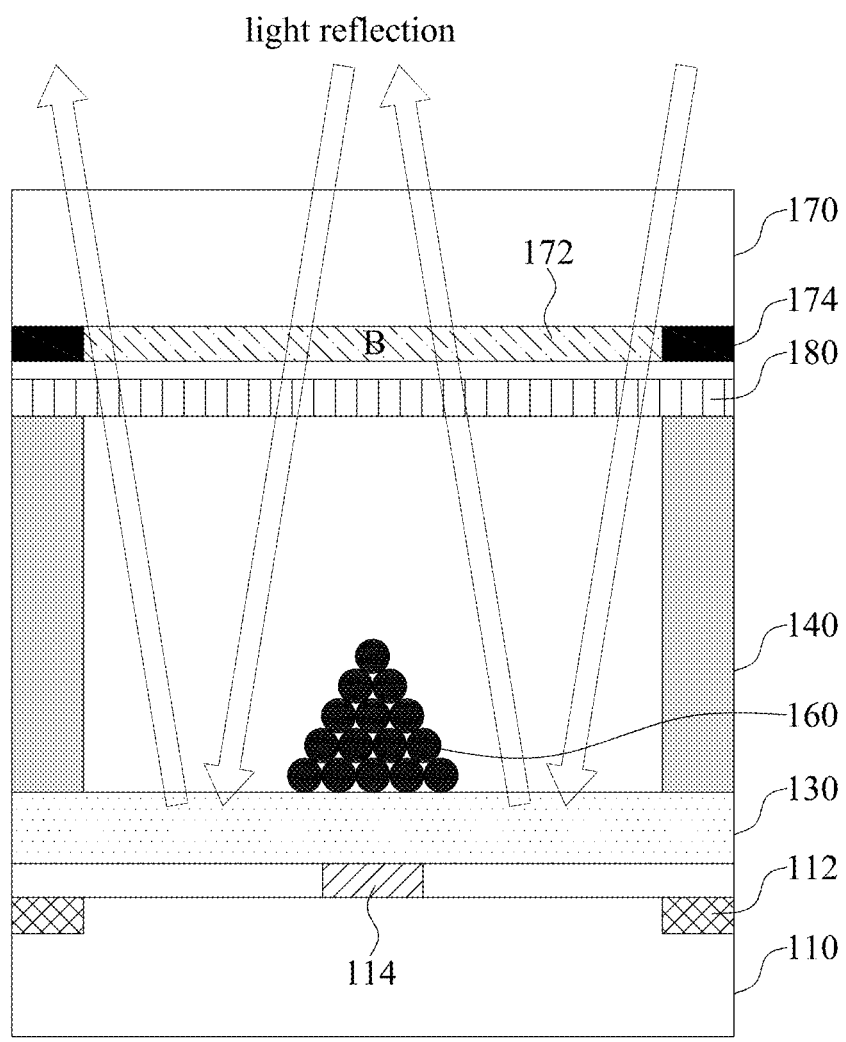
Figure 9:
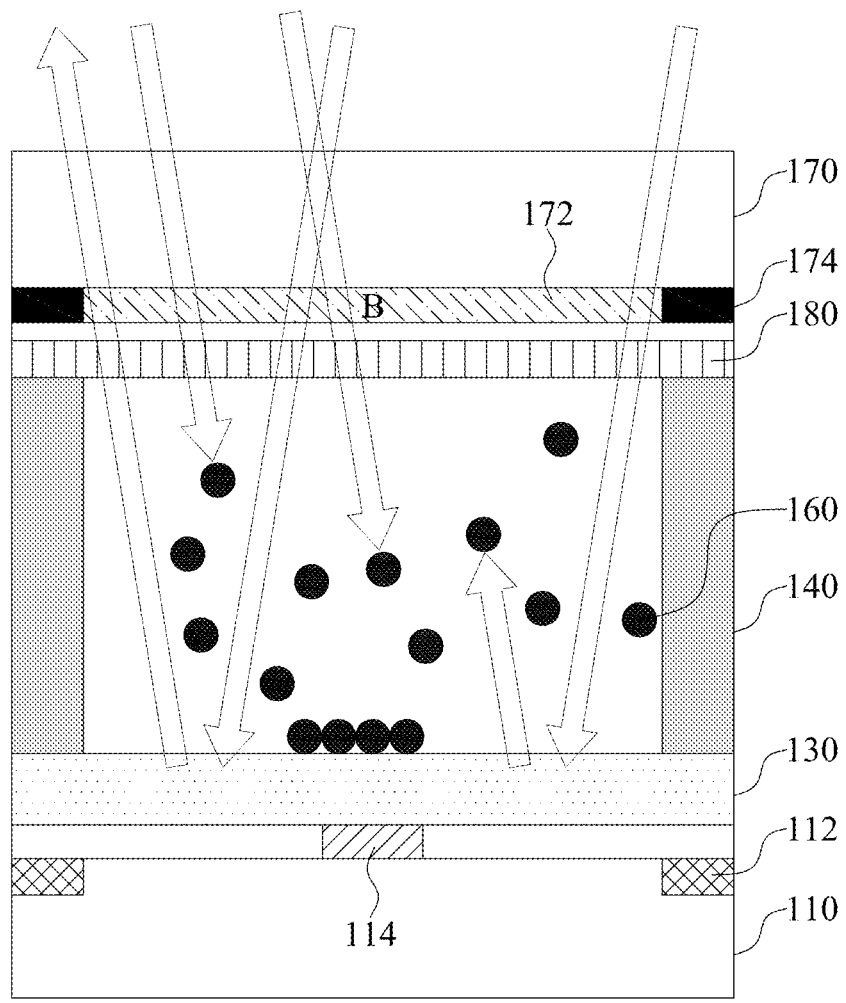

FIGS. 7 to 9 are views illustrating an image realization method of a display device according to an embodiment of the present invention.

Referring to FIGS. 7 to 9, in the display device according to an embodiment of the present invention, the charged particles 160 move inside the solvent 150 according to an electric field that is generated in each pixel by the common voltage Vcom of the common electrode 180 and the data voltage of the pixel electrode 114, thereby realizing an image. In FIGS. 7 to 9, for example, the charged particles 160 are illustrated as being colored in black.

A first electric field is generated in a pixel, and thus, as illustrated in FIG. 7, when the charged particles 160 move toward the common electrode 180, namely, toward the upper side of the pixel, external incident light that passes through the color filter 172 is absorbed by the charged particles 160 which are colored in black. In this case, the external incident light is not reflected, and thus, the pixel displays a black image. That is, the luminance of an image displayed by each pixel is minimized A second electric field is generated in a pixel, and thus, as illustrated in FIG. 8, when the charged particles 160 move toward the pixel electrode 114, namely, toward the central portion of the lower side of the pixel, light that passes through the color filter 172 is incident on the reflector 130.

The reflector 130, as described above, is formed to include a plurality of reflective layer pairs that reflect red light, green light, and blue light, and thus reflects incident color light toward the upper side of a pixel, namely, toward the color filter 172.

Color light, which is reflected by the reflector 130 and is incident on the color filter 172, is outputted to the outside, and each pixel displays an image in a color corresponding to that of the color filter 172. In this case, the luminance of an image displayed by each pixel is maximized.

As illustrated in FIG. 9, when a third electric field having a value between the first and second electric fields is generated, the charged particles 160 move with the third electric field and are disposed at a specific position inside a pixel.

In this case, some of incident color light that passes through the color filter 172 is absorbed by the charged particles 160, and the other color light is reflected by the reflector 130. The reflector 130 is formed to include a plurality of reflective layer pairs that reflect red light, green light, and blue light, and thus reflects incident color light toward the upper side of a pixel, namely, toward the color filter 172.

Some of total color light, which passes through the color filter 172 and is incident on a pixel, is absorbed by the charged particles 160, and the other color light is reflected by the reflector 130 and then outputted to the outside, whereupon each pixel displays an image in a color corresponding to that of the color filter 172. In this case, the image displayed by each pixel is displayed at certain luminance between the minimum luminance according to the embodiment of FIG. 7 and the maximum luminance according to the embodiment of FIG. 8, and the certain luminance is adjusted with the third electric field.

The color filter 172 of the display device according to an embodiment of the present invention has been illustrated and described above as being formed on the upper substrate 170, but this is merely one embodiment of the present invention.

Figure 10:
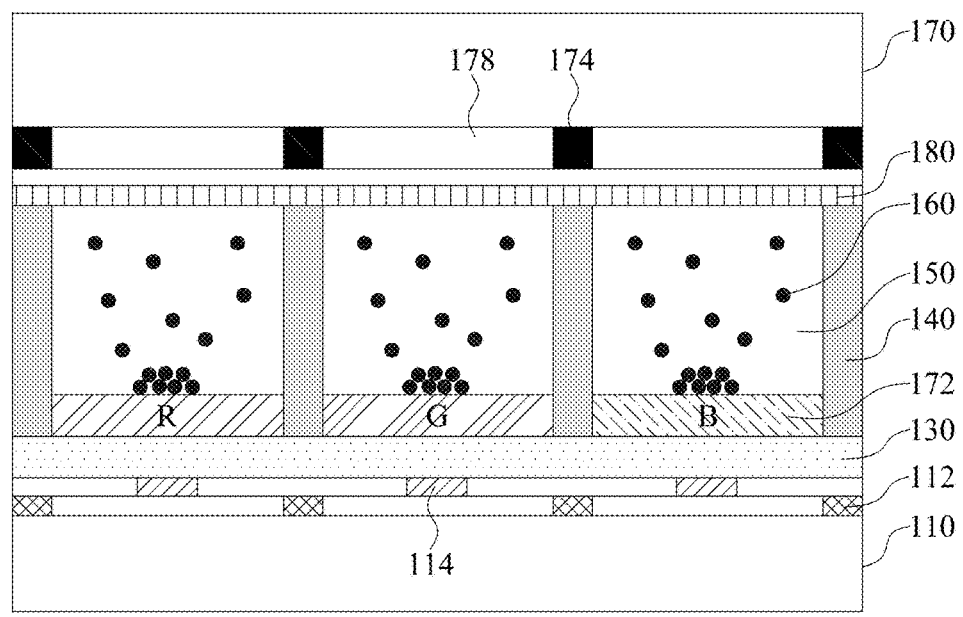
FIG. 10 is a view illustrating a display device according to another embodiment of the present invention.

In another embodiment of the present invention, as illustrated in FIG. 10, a plurality of color filters 172 may be formed on a lower substrate 110 (specifically, on a reflector 130), in respective correspondence with a plurality of pixels. In this case, a transparent layer 178 using a transparent resin may be formed at a position where the color filter of FIG. 2 was formed, namely, between adjacent light blocking layers 174 that divide each pixel. Herein, the transparent layer 178 may be formed in plurality.

In the display device according to another embodiment of the present invention including the above-described elements, a display solvent is internalized into the lower substrate 110, and a reflector 130, including a plurality of reflective layer pairs that selectively reflect multiple color light, is formed on the lower substrate 110. Therefore, the reflector 130 reflects multiple color light that is inputted into a pixel via a corresponding color filter 172, thereby realizing a mono image and a color image.

Moreover, by increasing the luminance, contrast ratio, and color reproduction ratio of the display device, the display quality of an image can be enhanced. Particularly, in the display device according to another embodiment of the present invention, the reflector 130 is formed such that the reflection of multiple color light is optimized, thus considerably increasing the color reproduction ratio of an image.

The display devices according to the above-described embodiments of the present invention can be manufactured using a manufacture infrastructure that is used in the manufacturing process of the existing LCD device.

According to the embodiments of the present invention, provided can be the display device which has high luminance, a high contrast ratio, and a high color reproduction ratio.

According to the embodiments of the present invention, provided can be the high efficiency reflector which can increase the light efficiency of reflective display devices and self-emitting display devices.

According to the embodiments of the present invention, provided can be an electrophoretic display device which can realize a high-quality image in various colors.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A reflector for an electrophoretic display device, wherein the electrophoretic display device includes a plurality of pixel electrodes receiving a plurality of data voltages supplied to a plurality of pixels respectively, and the reflector is formed on all of the plurality of pixel electrodes, the reflector comprising:
a first reflective layer pair reflecting red light;
a second reflective layer pair reflecting green light;
and a third reflective layer pair reflecting blue light,
wherein the first to third reflective layer pairs are formed as a plurality of inorganic layers,
the first, second and third reflective layer pairs are sequentially stacked iteratively,
the first reflective layer pair includes a stop band that corresponds to a red color wavelength, the second reflective layer pair includes a stop band that corresponds to a green color wavelength, and the third reflective layer pair includes a stop band that corresponds to a blue color wavelength, wherein each of the first to third reflective layer pairs comprises:
a first inorganic layer; and
a second inorganic layer having a refractive index lower than the first inorganic layer;
wherein the first inorganic layer has a refractive index of 1.9 to 2.8, and the second inorganic layer has a refractive index of 1.3 to 1.7,
wherein the red light, the green light or the blue light is reflected on only a surface between the first inorganic layer and the second inorganic layer, wherein the first inorganic layer includes $Al_2O_3$,
wherein the reflector further comprises one or more additional reflective layer pairs reflecting color light having a wavelength different from wavelengths of the red light, green light, and blue light,
wherein the one or more additional reflective layer pairs includes a stop band corresponding to a color wavelength of the color light, the one or more additional reflective layer pairs comprises the first inorganic layer and the second inorganic layer, the color light is reflected on only a surface between the first inorganic layer and the second inorganic layer, and the first inorganic layer includes $Al_2O_3$, and
wherein the reflector reflects color light having a wavelength less than or equal to 450 nm and color light having a wavelength greater than or equal to 780 nm.

2. The reflector of claim 1, wherein the second inorganic layer is formed of $SiO_2$ or an inorganic material comprising $SiO_2$.

3. The reflector of claim 1, wherein the first inorganic layer is formed to have a thickness of 200 Å to 1,000 Å, and the second inorganic layer is formed to have a thickness of 500Å to 1,500 Å.

4. The reflector of claim 3, wherein each of the first to third reflective layer pairs and the one or more additional reflective layer pairs reflects color light having any one of wavelengths of 450 nm to 780 nm.

5. The reflector of claim 1, wherein the first, second and third reflective layer pairs and the one or more additional reflective layer pairs are formed of the same material and each of the first, second and third reflective layer pairs has a different thickness according to a wavelength of color light to be reflected.

6. The reflector of claim 1, wherein the second inorganic layer in each of the first, second and third reflective layer pairs and the one or more additional reflective layer pairs is formed of the same material, and
wherein the first inorganic layer in each of the first, second and third reflective layer pairs and the one or more additional reflective layer pairs is formed of a different material than the same material of the second inorganic layer in each of the first, second and third reflective layer pairs and the one or more additional reflective layer pairs.

7. The reflector of claim 1, wherein the first, second and third reflective layer pairs and one or more additional reflective layer pairs reflect 90% or more of color light incident on the reflector.

8. The reflector of claim 1, further comprising fourth and fifth reflective layer pairs,
wherein the first, second, third, fourth and fifth reflective layer pairs reflect approximately 100% of color light incident on the reflector.

9. The reflector of claim 1, wherein the first inorganic layer is formed of inorganic material of SiNx or ZnO.

10. The reflector of claim 1, wherein the first inorganic layer is formed of inorganic material of SiNx and ZnO.

* * * * *